(12) United States Patent
Grover

(10) Patent No.: US 8,951,100 B2
(45) Date of Patent: *Feb. 10, 2015

(54) FIELD DRESSING KNIFE

(71) Applicant: Rick Grover, Haleiwa, HI (US)

(72) Inventor: Rick Grover, Haleiwa, HI (US)

(*) Notice: Subject to any disclaimer, the term of this patent is extended or adjusted under 35 U.S.C. 154(b) by 0 days.

This patent is subject to a terminal disclaimer.

(21) Appl. No.: 13/948,574

(22) Filed: Jul. 23, 2013

(65) Prior Publication Data
US 2014/0059867 A1  Mar. 6, 2014

Related U.S. Application Data

(63) Continuation of application No. 13/680,536, filed on Nov. 19, 2012, now Pat. No. 8,512,107.

(60) Provisional application No. 61/669,860, filed on Jul. 10, 2012.

(51) Int. Cl.
*A22B 5/16* (2006.01)
*B26B 9/02* (2006.01)
*A22B 5/00* (2006.01)
*B26B 5/00* (2006.01)

(52) U.S. Cl.
CPC ............... *B26B 9/02* (2013.01); *A22B 5/0047* (2013.01); *A22B 5/168* (2013.01); *B26B 5/00* (2013.01)
USPC .......................................................... 452/132

(58) Field of Classification Search
USPC ........................................ 452/102–105, 132
See application file for complete search history.

(56) References Cited

U.S. PATENT DOCUMENTS

| 6,471,577 | B1 | 10/2002 | Hendrickson |
| 6,607,430 | B1 | 8/2003 | Navarette |
| 6,722,969 | B2 | 4/2004 | Hendrickson |
| 8,512,107 | B1* | 8/2013 | Grover .......................... 452/132 |
| 2004/0203332 | A1 | 10/2004 | Hendrickson |

* cited by examiner

*Primary Examiner* — Richard Price, Jr.
(74) *Attorney, Agent, or Firm* — Dergosits & Noah LLP; Todd A. Noah

(57) ABSTRACT

A knife includes a body that includes a handle section, a substantially circular blade housing section, and a blade including a cutting edge having substantially the same radius of curvature of the blade housing. The substantially circular blade housing section extends substantially perpendicular from the handle section. The blade extends longitudinally out of the blade housing at a position substantially 180° away from the position of the handle section along the circumference of the blade housing and terminates in a sharp point. The width of the blade at the portion immediately adjacent to the blade housing and opposite the blade point is substantially equal to the diameter of the blade housing.

4 Claims, 6 Drawing Sheets

FIELD DRESSING KNIFE

CROSS-REFERENCE TO RELATED APPLICATIONS

This patent application is a continuation of U.S. patent application. Ser. No. 13/680,536, now U.S. Pat. No. 8,512,107, issued Aug. 20, 2013, which claims priority to U.S. Provisional Patent Application No. 61/669,860, filed on Jul. 10, 2012 now U.S. Pat. No. 8,512,107 both of which are incorporated herein by reference.

FIELD OF THE INVENTION

The present invention relates to a knife for complete field dressing of hunted game.

BACKGROUND

Field dressing is the process of removing the internal organs and skin of hunted game. Proper field dressing is an essential first step in preventing the growth of disease-causing bacteria and preserving the meat from animals harvested in the wild. Field dressing must be done as soon as possible in order to ensure rapid body heat loss and to prevent bacterial growth from the internal organs and body fluids from spreading through the carcass, thus ensuring than the meat stays fit for human consumption and improving the overall quality of the meat.

Field dressing is generally carried out with conventional single blade hunting or skinning knives. A conventional knife may be used to make an incision by the point of the knife blade through the skin and the abdominal wall of the carcass, and then the skin of the animal may be cut away by the blade. Great care must be taken so as not to puncture the intestines or the stomach of the animal with the point of the knife since this would spoil the meat and the hide of the animal. One technique commonly used by hunters is to grasp a conventional knife with the blade facing upwards to avoid cutting the intestines and the entrails. Another commonly used technique is to insert two fingers (one on each side of the knife blade) into the incision, pushing the intestines and the entrails down and away from the knife.

Conventional knives are generally not well suited for field dressing operations because the tip of a conventional knife blade is pointed. With a pointed-end blade configuration, the occurrence of undesirable cutting or perforation of meat or internal organs is highly probable, since it is very difficult to tightly control the depth of the penetration of a conventional knife blade so as to avoid such cutting or perforation. If the hunter is an experienced field dresser, he or she may make only a few small nicks in the carcass. If he or she is a novice, attempting to field dress an animal with a conventional knife may result in significant damage to the meat and a potential loss of the entire carcass.

Other tools available to hunters for field dressing include single blade knives with a gut hook built in into the back of the blade, such as, for example, a disposable skinning knife "Gerber E-Z Zip Gut Hook Blade" from Gerber. However, these knives are usually too small to field dress large game and are very difficult to sharpen. The "Gerber E-Z Zip Gut Hook Blade" knife has a small handle which is awkward to use and is easily breakable.

It would therefore be a significant advance in the art to provide a multifunctional, safe, strong and easy to use field dressing knife by which small and large game may be field dressed, and which is designed to overcome the aforementioned perforation and cutting difficulties associated with the conventional skinning or hunting knives.

BRIEF SUMMARY OF THE INVENTION

An object of the present invention is to provide a safe and multifunctional field dressing knife with multiple interchangeable blades which are quickly and easily removable. An object of this invention is to provide a field dressing knife (guided skinner) with improved blade housing which allows the user to control the depth of the penetration of the blade so as to avoid cutting or perforation of meat or internal organs of the animal. The field dressing knife described herein enables a user to cut the hide of the animal and remove it from the carcass without damaging the meat of the animal. The field dressing knife according to the present invention also includes an improved grip handle which is designed to provide both right-handed and left-handed users with improved leverage and control for field dressing an animal carcass.

BRIEF DESCRIPTION OF THE DRAWINGS

The invention may be more readily understood by referring to the accompanying drawing in which.

Like numerals refer to like parts throughout the several views of the drawings.

DETAILED DESCRIPTION

Figure 1:
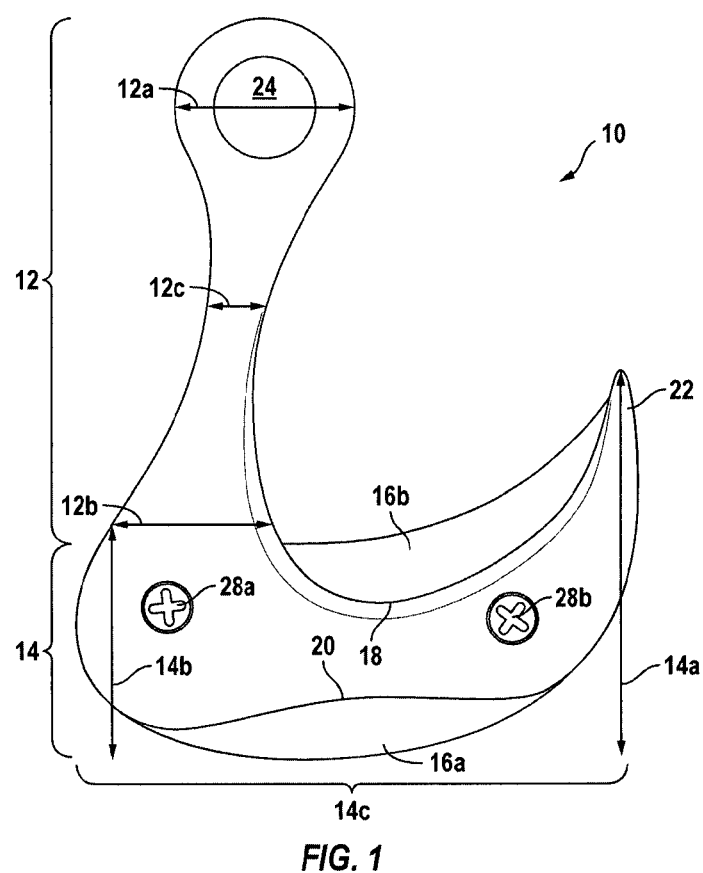
FIG. 1 is a side view of the knife according to the present invention.

An embodiment of a field dressing knife 10 is shown in FIG. 1. The knife 10 includes a body having an elongated handle section 12 and a blade housing section 14. The body of the knife 10 can be formed in two planar sections with a space for a blade 16 between the two planar sections. The blade 16 includes a guided skinning edge 16a and a gut/hide hook cutting edge 16b.

The blade 16 extends above the top edge 18 of the blade housing section 14 and/or below the bottom edge 20 of the blade housing section 14. In some embodiments, the skinning edge 16a of the blade 16 has a width that extends beyond the bottom edge 20 of the blade housing section 14. The close proximity of the bottom edge 20 of the blade housing section 14 to the skinning edge 16a enables the bottom edge 20 of the blade housing section 14 to function as a guard that prevents the skinning edge 16a from entering a carcass deep enough to damage the meat, the hide of the animal and/or the internal organs of the carcass during field dressing. The proximity of the bottom edge 20 of the blade housing section 14 to the skinning edge 16 may be less than 0.25 inch.

The top edge 18 of the blade housing section 14 may terminate in a hook portion 22 which extends beyond the cutting edge 16b of the blade 16. The hook portion 22 lifts the skin and/or hide of a carcass away from the meat and/or internal organs of the carcass as the cutting edge 16b is moved through the carcass during field dressing, thereby preventing the cutting edge 16b from undesirable cutting or perforation of the meat and/or internal organs of the carcass.

The elongated handle section 12 includes a proximal end 12a, a distal end 12b, and a center 12c that is approximately equidistant between the proximal end 12a and the distal end 12b. A bore 24 extends through the proximal end 12a of the elongated handle section 12. An elongated grip handle extends through, and is dimensioned to fit, the bore 24 at the proximal end 12a of the elongated handle section 12.

The length dimension of the elongated handle section 12 may be between about 2 inches and about 4 inches. The width dimension at the proximal end 12a of the elongated handle section 12 may be between about 0.75 inches and about 2 inches. The width dimension at the distal end 12b of the elongated handle section 12 may be between about 0.75 inches and about 2 inches. The width dimension at the center 12c of the elongated handle section 12 may be between about 0.25 inches and about 1 inch. The width dimensions of 12a, 12b, and 12c may be generally perpendicular to the length dimension of the elongated handle section 12.

The distal end 12b of the elongated handle section 12 is coupled to an end of the blade housing section 14. The elongated handle section 12 may be formed substantially perpendicular to the blade housing section 14. The elongated handle section 12 and the blade housing section 14 may be formed from high grade aluminum, reinforced plastic, or any number of other suitable materials.

The blade housing section 14 includes a front end 14a and a back end 14b. The length dimension 14c of the blade housing section 14 may be between about 2 inches and about 5 inches. The width dimension at the front end 14a of the blade housing section 14 may be between about 1.5 inches and about 4 inches. The width dimension at back end 14b of the blade housing section 14 may be between about 0.75 inches and about 2 inches. The blade housing section 14 has width dimensions 14a and 14b generally perpendicular to the length direction 14c.

The blade housing section 14 includes means to connect the two planar sections. The blade housing section 14 may be provided with aligned passages 28a and 28b. The aligned passages 28a and 28b are located near the opposite ends of the blade housing section 14 and are aligned with passages in the blade 16 to provide a continuous passageway through the two planar sections of the blade housing section 14 and the blade 16. The aligned passages 28a and 28b may be circular in shape. The aligned passages 28a and 28b may be threaded to receive screws or bolts to connect the two planar sections of the blade housing section 14, with the blade 16 sandwiched between the two planar sections of the blade housing section 14. The two planar sections of the blade housing section 14 may be separated, if required, to remove and replace or sharpen the blade 16. In other embodiments, any other mechanism can be used to connect the two planar sections of the blade housing section 14 together with the blade 16 sandwiched between the two planar sections of the blade housing section 14.

Figure 2:
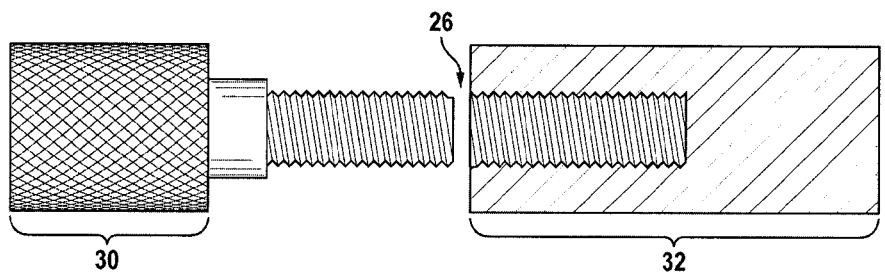
FIG. 2 is an exploded side view showing the grip handle of the knife.

As shown in FIG. 2, an elongated grip handle 26 can be formed in two parts, a male part 30 and a female part 32. The elongated handle section 12 and the elongated grip handle 26 are dimensioned to fit comfortably in the hand of the user, and are preferably designed for use by both right-handed and left-handed persons. The female part 32 has a length dimension which is sized to be about twice the length dimension of the male part 30. For a right handed user, the male part 30 may be positioned on the right side of the elongated grip handle 28, and the female part 32 may be positioned on the left side of the elongated grip handle 26. This orientation of the male part 30 and the female part 32 provides sufficient gripping space on male part 30 for the thumb of a right-handed user and ensures improved control of the knife 10 during field dressing. For a left-handed user, the positions of the male part 30 and the female part 32 may be reversed, providing sufficient gripping space for the thumb of a left-handed user on the male part 30 and ensuring improved control of the knife 10 during field dressing.

Figure 3:
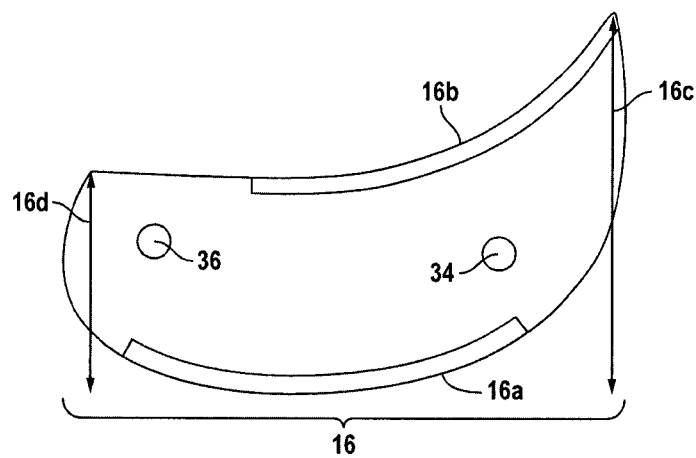
FIG. 3 is a side view of an embodiment of the blade.

As shown in FIG. 3, the blade 16 has a first planar side, a second planar side, a front end 16c, a back end 16d, and at least one cutting edge. The blade 16 is preferably formed from a suitable metal such as stainless steel. The first planar side and the second planar side of the blade 16 are in contact with and sandwiched between the two planar sections of the blade housing section 14. The length dimension of the blade 16 may be between about 2 inches and about 5 inches. The width dimension at the front end 16c of the blade 16 may be between about 1.5 inches and about 3 inches. The width dimension at the back end 16d of the blade 16 may be between about 0.75 inches and about 2 inches. The blade 16 has width dimensions 16c and 16d that are generally perpendicular to the length dimension 16. The blade 16 may include the means for aligning the blade inside the blade housing section 14. In some embodiments, the blade 16 may include passages 34 and 36 for insertion of alignment tabs. The passages 34 and 36 may receive screw or bolts that are threaded through the aligned passages 28a and 28b in FIG. 1. In other embodiments, any other mechanism can be used to align the blade 16 inside the blade housing section 14. The blade 16 includes the guided skinning edge 16a and/or the hook cutting edge 16b. The blade 16 has a substantially convex guided skinning edge 16a and/or a substantially concave hook cutting edge 16b. The curvature of the concave hook cutting edge 16b of the blade 16 may be generally similar to the curvature of concave top edge 18 of the blade housing section 14 in FIG. 1. The curvature of the convex skinning edge 16a of the blade 16 may be generally similar to the curvature of convex bottom edge 20 of the blade housing section 14 in FIG. 1

Figure 4:
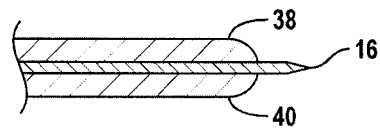
FIG. 4 is a fragmentary top view of the knife according to the present invention.

As shown in FIG. 4, the blade 16 is designed to fit inside the blade housing section 14 sandwiched between two planar sections parts 38 and 40. The guided skinning edge 16a of blade 16 extends outside the blade housing section such that two planar sections 38 and 40 of the housing act as a guide for the skinning edge 16a of blade 16, which prevents the skinning edge 16a of blade 16 from cutting the meat and the hide. The two planar sections 38 and 40 of the housing also provide for interchangeable blades so that the blade can be easily replaced when dull. The housing also enables the blade as shown in FIGS. 5 and 6 to be used.

Figure 5:
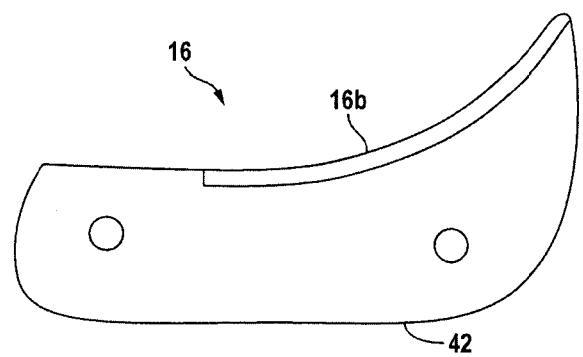
FIG. 5 is a side view of an embodiment of the blade.

FIG. 5 illustrates another embodiment of the blade 16 which includes the substantially concave hook cutting edge 16b and a substantially flat opposing surface 42 without a sharp edge. The curvature of concave hook cutting edge 16b of the blade 16 according to this embodiment may be generally similar to the curvature of top edge 20 of the blade housing section 14 in FIG. 1.

Figure 6:
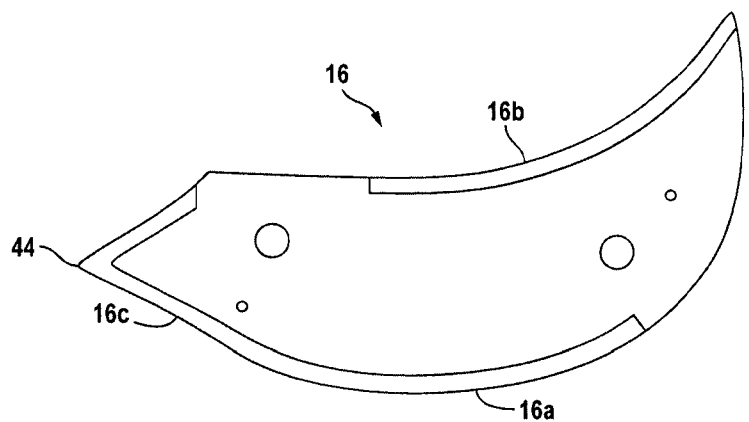
FIG. 6 is a side view of an embodiment of the blade.
Figure 7:
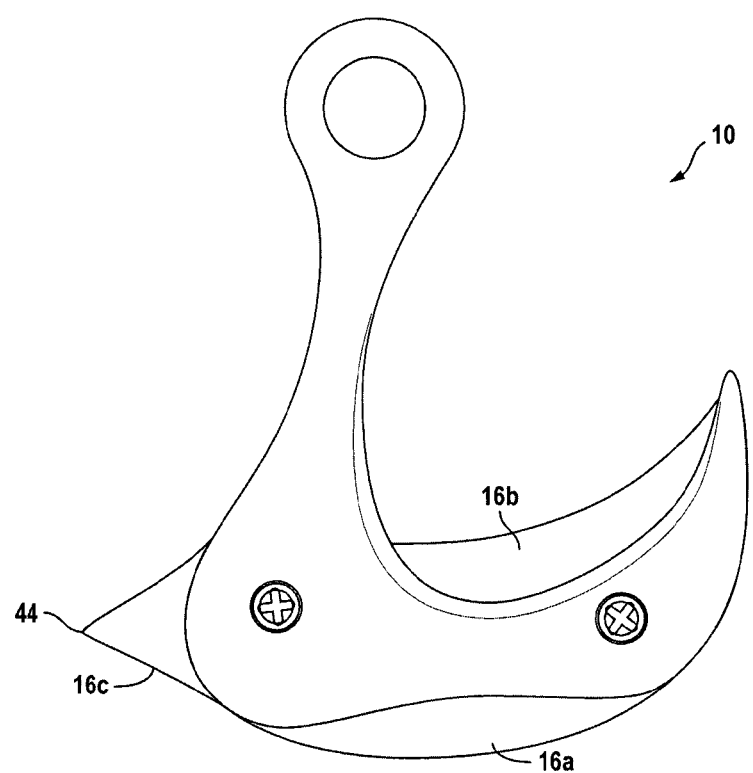
FIG. 7 is a side view of the knife according to an embodiment of the present invention.

FIG. 6 illustrates an embodiment of the blade 16 which includes the hook cutting edge 16b and the skinning edge 16a. The blade 16 also includes cutting edge 16c that extends around the back side of the blade 16 and terminates in a sharp point 44. The cutting edge 16c can be used as a conventional blade for general purpose cutting. FIG. 7 illustrates an embodiment of knife 10 which includes the blade shown in FIG. 6 contained in the blade housing.

Figure 8:
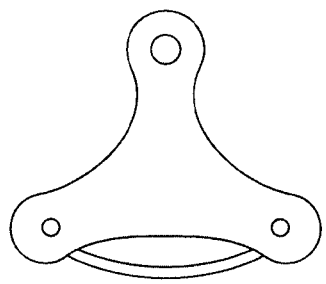
FIG. 8 is a side view of the knife according to an embodiment of the present invention.
Figure 9A:
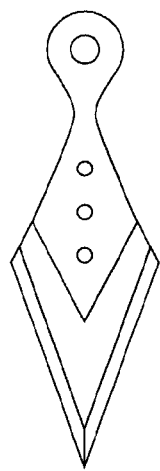
FIG. 9A is a side view of the knife according an embodiment of the present invention.
Figure 9B:
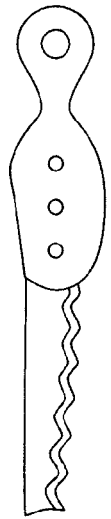
FIG. 9B is a side view of the knife according an embodiment of the present invention.
Figure 9C:
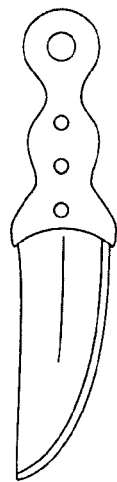
FIG. 9C is a side view of the knife according an embodiment of the present invention.
Figure 9D:
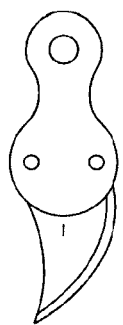
FIG. 9D is a side view of the knife according an embodiment of the present invention.
Figure 9E:
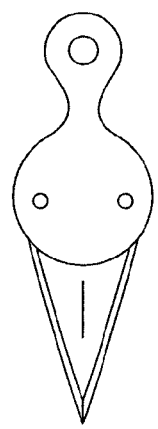
FIG. 9E is a side view of the knife according an embodiment of the present invention.

FIG. 8 illustrates an embodiment of knife 80 which only includes a skinning edge 16a that extends outside the blade housing section such that two planar sections 38 and 40 (shown in FIG. 4) of the housing act as a guide for the skinning edge 16a. This prevents the skinning edge 16a from cutting the meat and the hide. The two planar sections of the housing also provide for interchangeable blades so that the blade can be easily replaced when dull.

While the description above illustrates embodiments of gaming and skinning knives, the inventive housing and handle combination can also be used for other types of knife designs such as those illustrated in FIGS. 9A, 9B, 9C, 9D and 9E.

The foregoing embodiments are merely examples of the present invention. Those skilled in the art may make numerous uses of, and departures from, such embodiments, without departing from the scope and spirit of the present invention. Accordingly, the scope of the present invention is not to be limited or defined by such embodiments in any way, but rather, is defined solely by the following claims.

What is claimed is:

1. A knife comprising:
 a body having a handle section secured to a substantially circular edge of a planar blade housing section that extends substantially perpendicular from the handle section, wherein the handle section is rigidly affixed to the blade housing section at a position along the circumference of the housing; and
 a blade having a convex cutting edge affixed within the blade housing section, wherein the blade extends longitudinally out of the blade housing section at a position along the circumference of the blade housing substantially 180° away from the position of the handle section along the circumference of the blade housing and terminates in a sharp point, wherein the width of the blade immediately adjacent to the blade housing and opposite the blade point is substantially equal to the diameter of the blade housing and wherein the convex cutting edge of the blade has substantially the same radius of curvature as the blade housing.

2. The knife of claim 1, wherein a bore extends through a proximal end of the handle section.

3. The knife of claim 2, wherein a grip handle extends through the bore in the proximal end of the handle section, wherein the grip handle is substantially perpendicular to the body, and wherein the grip handle is interchangeable to accommodate a right-hander user and a left-handed user.

4. A knife of claim 1, wherein the body of the knife is formed in two parts that enable separation of the body for at least one of replacing the blade and sharpening the blade, and wherein the body includes means for connecting the two parts.

\* \* \* \* \*